(12) United States Patent
Handler

(10) Patent No.: US 8,183,471 B2
(45) Date of Patent: May 22, 2012

(54) CABLE RACEWAY

(75) Inventor: Jordan Handler, Rye Brook, NY (US)

(73) Assignee: Mono-Systems, Inc., Rye Brook, NY (US)

( * ) Notice: Subject to any disclaimer, the term of this patent is extended or adjusted under 35 U.S.C. 154(b) by 337 days.

(21) Appl. No.: 12/540,307

(22) Filed: Aug. 12, 2009

(65) Prior Publication Data

US 2010/0038129 A1     Feb. 18, 2010

Related U.S. Application Data

(60) Provisional application No. 61/088,174, filed on Aug. 12, 2008.

(51) Int. Cl.
    *H02G 3/08*          (2006.01)
    *H02G 3/10*          (2006.01)

(52) U.S. Cl. ...... 174/481; 174/480; 174/68.1; 174/68.3; 220/3.3; 220/3.8; 52/220.1; 52/220.7

(58) Field of Classification Search .................. 174/480, 174/481, 68.1, 68.3, 60, 72 C, 70 C, 97, 99 R, 174/96, 72 R, 101, 95, 72 A; 52/220.1, 220.3, 52/220.5, 220.7, 249; 439/207, 209–213; 248/200, 49, 68.1

See application file for complete search history.

(56) References Cited

U.S. PATENT DOCUMENTS

| 3,815,304 | A | | 6/1974 | Schille et al. |
| 4,874,322 | A | | 10/1989 | Dola et al. |
| 4,942,271 | A | * | 7/1990 | Corsi et al. ............ 174/101 |
| 4,990,722 | A | | 2/1991 | Benito Navazo |
| 5,784,841 | A | * | 7/1998 | Nowell ................ 174/101 |
| 5,879,185 | A | | 3/1999 | Handler et al. |
| 6,084,180 | A | * | 7/2000 | DeBartolo et al. ........ 174/95 |
| 6,107,575 | A | * | 8/2000 | Miranda ............... 174/68.3 |
| 6,323,421 | B1 | * | 11/2001 | Pawson et al. ......... 174/68.1 |
| 6,362,420 | B1 | * | 3/2002 | Bacouelle et al. ...... 174/68.3 |
| 6,384,336 | B1 | * | 5/2002 | VanderVelde et al. ..... 174/95 |
| 6,936,766 | B1 | * | 8/2005 | Galasso ................ 174/481 |
| 6,972,367 | B2 | | 12/2005 | Federspiel et al. |
| 7,304,240 | B1 | | 12/2007 | Gretz |

FOREIGN PATENT DOCUMENTS

| DE | 1 130 492 | 5/1962 |
| EP | 0 113 981 | 12/1983 |
| EP | 0 217 514 | 8/1986 |
| EP | 0 644 640 | 8/1994 |
| GB | 1 433 401 | 4/1973 |

* cited by examiner

*Primary Examiner* — Angel R Estrada

(74) *Attorney, Agent, or Firm* — Ostrolenk Faber LLP

(57) ABSTRACT

A cable raceway including top and bottom walls, rear and front walls and a divider extending along substantially the entire length of the raceway. The divider extends in the direction between the top and bottom walls of the raceway. The raceway is comprised of a rear module of the raceway and the next module outward is a front module completing the preceding module passages. A cover over the front module passage completes that passage.

9 Claims, 3 Drawing Sheets

CABLE RACEWAY

CROSS REFERENCE TO RELATED APPLICATIONS

This patent application claiming the benefit of U.S. Patent Provisional Application No. 61/088,174, filed Aug. 12, 2008 in the name of Jordan Handler and entitled CABLE RACEWAY, the disclosure of which is incorporated by reference herein.

BACKGROUND OF THE INVENTION

A cable or wire raceway comprises at least one a conduit for conducting cables or wires along a wall, ceiling, floor, etc. (collectively wall). A typical raceway is applied along and extends along the wall. It has one or more passages extending through the conduit along the raceway through which cables, wires, etc. are conducted. At spaced intervals, the raceway may have cable outlets, typically in its outward facing, front side surface. An electrical device or data device to be supplied by one of the cables is attached to the raceway surface at an outlet and the cable exits the raceway outlet and is attached to the device there.

Many current raceways accommodate power cables or data cables, or a combination of both. By local building codes, power and data cables in a cable raceway often must be segregated. Therefore, many raceways are divided internally by a divider that extends along substantially the entire length of the raceway. This means that there are occasional interruptions in the divider. All divided raceways known to the inventor hereof are divided by a divider that is oriented horizontally, that is, perpendicular to the wall at which the raceway is mounted and spaced between the top and bottom walls of the raceway. A short length separator at an occasional interval, as is in U.S. Pat. No. 4,874,322, does not satisfy the requirement for a divider that separates cables and that is useful for enabling vertical direction bending of cables, as described below.

Additionally, most raceway systems position power and data devices served by the raceway on or in the outer face of the raceways, which is the side of the raceway away from the wall on which the raceway is mounted. Positioning the power and data devices in this horizontal side of the raceway places emphasis on the depth of the raceway (distance from the wall) in direct relation to the raceway fill capacity, but more important, in relation to the capabilities of the raceway to accommodate many of today's (and tomorrow's) advanced data cables. The following example of cables is exemplary and not limiting as to the dimension and design of and the use of the raceway herein.

Today's data cables (Cat. 5e and Cat. 6, and soon 10-gig) have diameters in a range between 0.25-0.33". The 10-gig cable, which will be used in the near-future, is 0.3" in diameter, and has a specification that requires a bend radius of 4 times the cable diameter. So, the 10-gig cable needs a bend radius of 1.2" not only when turning a corner in a room, but also when being attached to a data device affixed at a surface of the raceway.

The need to accommodate the 1.2" cable bend radius at every data device on the raceway means that a raceway with devices facing horizontally and on the outer wall of the raceway would need to be a minimum of 3" deep, and perhaps slightly greater. This need for depth is due to the data cables, not the power cables. The deeper the raceway is to achieve the necessary accommodation for the data cable bend for attaching to a device on the raceway, the more excess room exists in the neighboring power cable compartment of the raceway. Engineers and architects desire to maintain a pleasant aesthetic in their spaces. Installing raceways that are all 3+" deep would be akin to installing a shelf into every raceway application. This may not be pleasing to a viewer.

No raceways now known to the inventor hereof have been built to accommodate 10-gig cables. The most popular multi-compartment (housing power and data) raceways are in the range of 1.75"-2.25" deep. They will not accommodate a 90° bend in a 10-gig line.

SUMMARY OF THE INVENTION

The present invention concerns a raceway with a vertically oriented divider between passages or compartments. The divider is attached to at least one of the top and bottom walls of the raceway. The raceway divider extends substantially along the entire length of the raceway and therefore along the wall on which the raceway is mounted. It extends in the direction between the top and bottom walls of the raceway defining two compartments. Each passage can carry cable in the raceway, which cable is to be displaced toward a device, typically a data device, either at the top or the bottom wall, and usually at the top wall, at which the data device faces upwardly. The raceway is tall enough so that cable, and particularly cable with a larger bend radius, can be bent in a vertical direction, that is in an essentially vertical plane or around a horizontal axis from the direction extending through the length of the raceway to the direction to extend vertically straight out of the raceway to connect to the data device being supplied. Since the bend is a vertical bend around a horizontal axis, rather than being a horizontal bend around a vertical axis, the raceway depth need not be so great to accommodate the bend radius as might be required if a prior art horizontal divider were used.

Additionally, the invention has a two compartment system. Starting with a decorative cover positioned on the outside of the raceway, which possibly may look like a chair rail or have another decorative profile, the cover is attached to a base unit using a ball and socket connection on one side, wherein a ball on one part rests in a groove or slot in the other part to serve as a rotation hinge, and using a latch arrangement on the other side. The same design is repeated for the second compartment closer to the wall.

The power and data devices may be housed in device boxes that are placed on top of the raceway, facing upward. Orientation of the devices to face upward allows a cable exiting the raceway to enter the device box and attach straight to the backside of the devices without any need to bend the cable at the device. This avoids issues related to bend radius. Additionally, by placing the devices outside of the confines of the raceway, design pathway to the raceway can be kept small.

The raceway accommodates a change in direction as occurs in corners in a room. At a corner, a molded fitting may be used. The internal profile of the fitting allows for the separate pathways and division of the pathways to maintain proper orientation. The bend in the corner will accommodate the correct bend radius.

A removable L-shaped divider 56 may be provided in the data cable passage 48. It is desirably snapped into place. It enables separation of different types of data cables, should this separation be desired.

DETAILED DESCRIPTION OF EMBODIMENTS OF THE INVENTION

Figure 1:
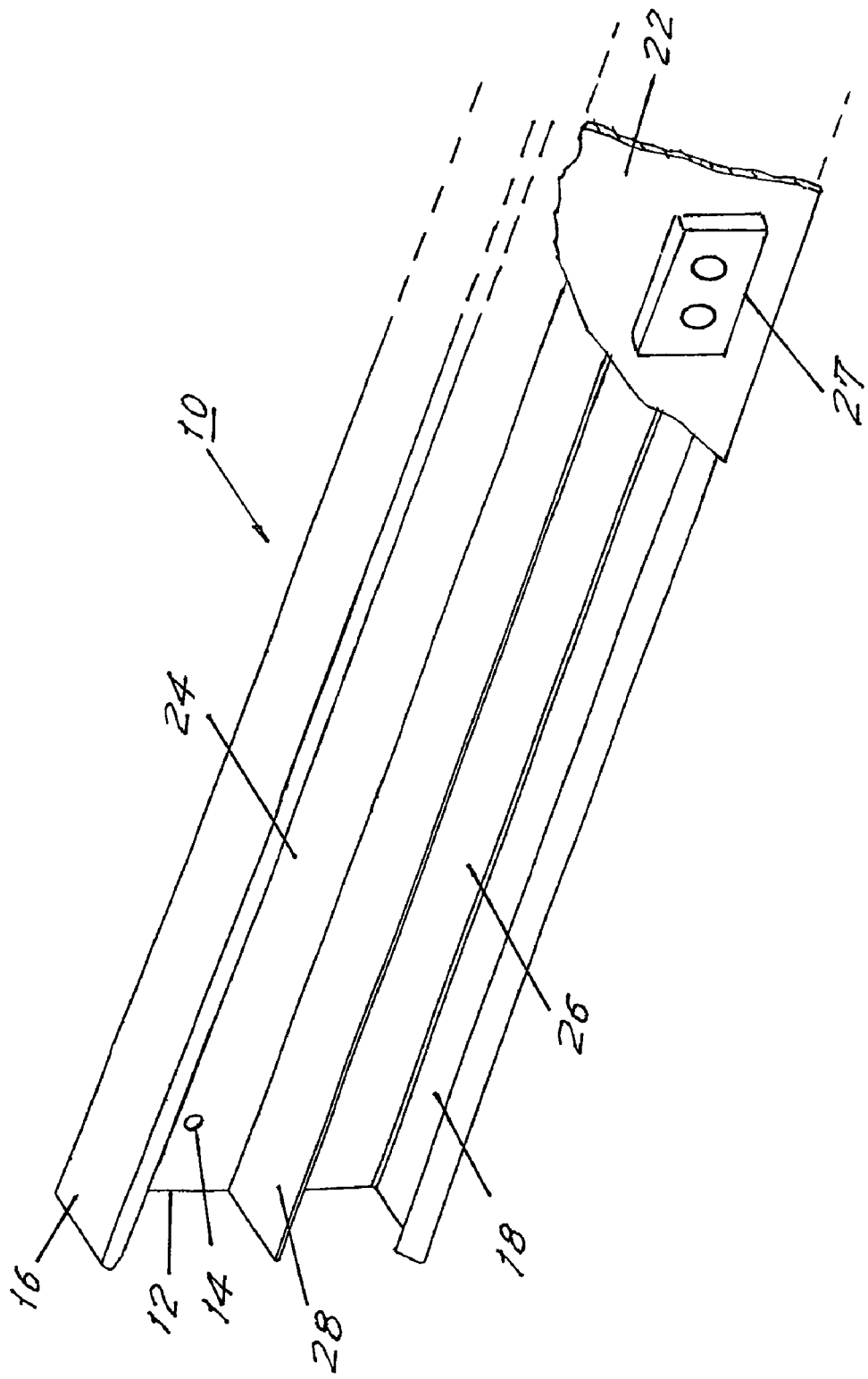
FIG. 1 is a perspective view mostly of the interior of a part of a cable raceway with cable passages, according to the prior art.

FIG. 1 illustrates a conventional multi-passage cable raceway 10. The raceway has a rear wall 12 which is fastened to a surface, such as on a wall or ceiling or floor, and the like (hereinafter generally a wall), wherein a fastener or screw may pass through an opening 14 in the rear wall. There are a top wall 16 and a bottom wall 18. There is a front wall 22, shown broken away, that extends over the entire front side of the raceway, closing the front of the raceway and defining two separate elongate passages, 24 above and 26 below, separated by a horizontal divider 28 that runs substantially the full length of the raceway. In this case, substantially the full length means over the length from end to end, with possible length interruptions to enable cable to pass through, or at joints between sections, or for further purposes, but otherwise extending substantially along the entire length of the raceway. The divider enables required separation between power and data cables, for example.

There is a data device, here shown as a plug socket 27 for such a device, on the front wall 22 at preselected intervals along the raceway. Cable runs along the raceway through the passages. At the preselected intervals, at least one or more than one of the cables running in the raceway passage is bent outwardly, in FIG. 1 horizontally 2, and is there connected to the device 27. Because there is a limit on the bend angle of cable so that the cable will not be damaged as it is bent out of its direction along the passage toward its direction toward the device 27. The passages 24 and 26 must be deep enough from the rear wall 12 to the front wall 22, that when the cable is bent horizontally, it is not damaged. This has required a height of the cable raceway off the wall to which it is attached, which may be taller, more obtrusive and less attractive than may be desired.

Figure 2:
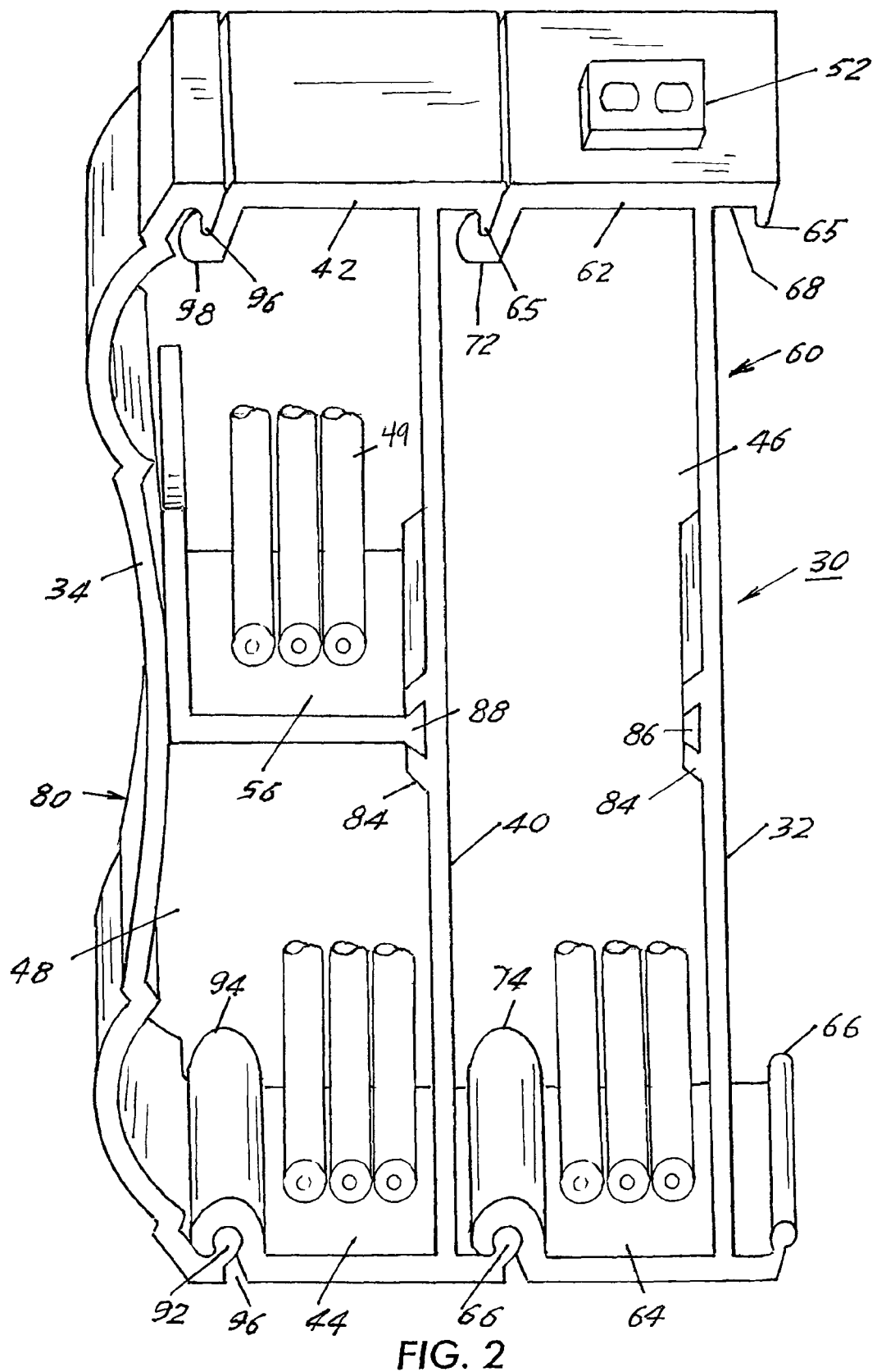
FIG. 2 is a top perspective view of a raceway section according to an embodiment of the invention.
Figure 3:
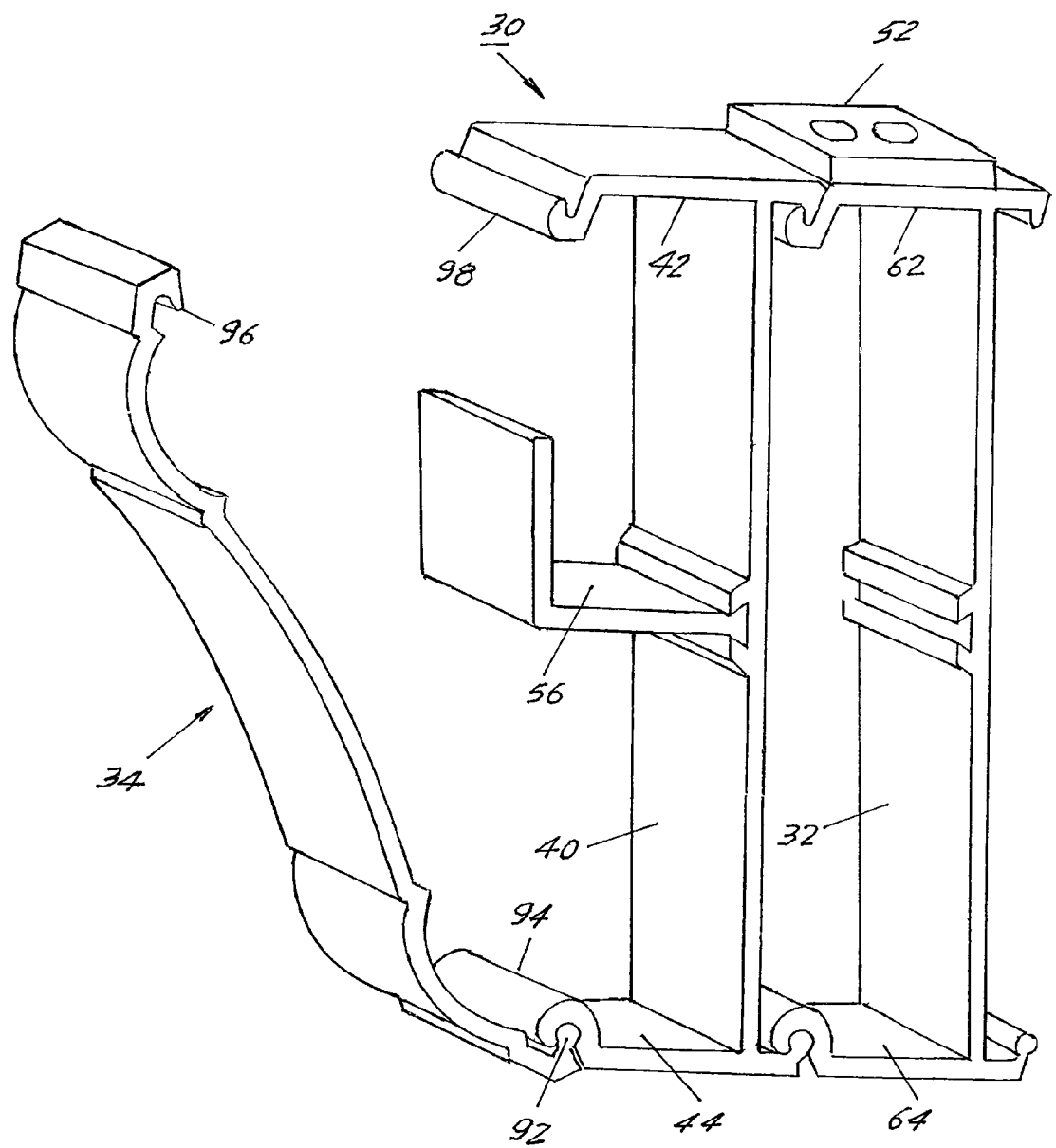
FIG. 3 is a perspective view and shows a cross-section of the raceway section in a temporarily open condition.

In contrast, an exemplary cable raceway embodiment according to the invention is illustrated in FIGS. 2 and 3. The entire cable raceway may be of any length, it may have corner bends, etc. It would be likely be made of individual sections attached at an end of butting connection. A single raceway section is shown as illustrative.

A primary, but not the only, difference between the raceway 30 in FIG. 2 and the prior art raceway 10 is that the below described divider 40 between the adjacent cable passages extends vertically in the direction between the top and bottom walls 42, 44 of the raceway, rather than horizontally between the front and rear walls. A data device 52, to which a cable in one of the passages would be connected is disposed on either one of the top or the bottom walls of the raceway. As a result, the height between top and bottom walls, in relation to the shorter width of the passages permits a cable with a larger bending radius to be bent from its position extending along the length of the raceway to a position shown in FIG. 2 where it is connected to the data device on the raceway. As a result, the height of the raceway off the wall to which it is supported may be more reduced for the particular type of cable than is possible with the conventional raceway.

The raceway 30 is a modular raceway. The elements of the raceway and of the modules thereof are now described. As with the conventional raceway, the raceway 30 has a rear wall 32 which is toward, but may not be attached directly to, the wall to which the raceway is mounted. It has an opposite front wall 34 which closes the front side of the raceway and the front passage 48. There is a vertical divider 40 between the front 34 and rear 32 walls that extends between the top wall 42 and the bottom wall 44 of the enclosed raceway. The front and rear walls, the top and bottom walls, and the divider define two separate channels or passages 46 and 48 for transmission of cable therealong. As seen in FIGS. 2 and 3, but without specific dimensions being illustrated, but with illustration of relative proportions, the height between the top and bottom walls 42 and 44 may be made is greater than the width of either the passages 46 and 48, although it is possible within the invention that the width of only one of the passages 46 and 48 may be narrower than the height between top and bottom walls 42 and 44. As a result of the relatively narrow width of either or both of the passages 46 and 48, cable with a relatively larger bending radius may be transmitted through the narrow passage 46 and may be bent on its bending radius around a horizontal axis from the direction extending along the passage toward the direction toward one or both of the top or bottom walls and, particularly in the embodiment shown in FIGS. 2 and 3, toward the top wall 42. At the top wall 42 there is a data device, shown as a socket for a device 52, which is on or in the wall 42 and communicates into the interior of the passage 46 through the wall, so that a cable 49 within the passage 46 can be bent up toward the top wall 42 and can be there be connected with the device 52. The relatively larger bending radius of the cable passing through the passage 46 may be accommodated due to the relatively larger height of the passage 46. As a result, the width of the passage 46 can be narrower than would be the case for a passage 46 arranged horizontally if the divider were horizontal, as is the divider 28 in FIG. 1.

Describing the fixture 52 in more detail, the power and data devices may be housed in device boxes 52 that are placed on top of the raceway wall 42, facing upward. Orientation of the devices to face upward allows a cable exiting the raceway to enter the device box and attach straight to the backside of the device box 52 without need to bend the cable at the device. This avoids issues related to the bend radius of the cable. Additionally, by preferably, but not necessarily, placing the devices 52 outside of the confines of the raceway, in one embodiment, design pathways to the raceway can be kept small.

The raceway also accommodates a change in direction as occurs in corners in a room. At a corner, a molded fitting may be used. The internal profile of the fitting allows for the separate pathways and division of the pathways to maintain proper orientation. The bend in the corner will accommodate the correct bend radius.

As shown, a removable L-shaped divider may be provided in a data cable passage 48. It is desirably snapped into place as described below. It enables separation of different types of data cables in the top and bottom parts of passage 48, should this separation be desired.

The illustrated embodiment has the additional benefit of being modular in construction, which would enable its size, particularly its number of passages to be a matter of choice for a particular application and its makes it assembly easier.

The illustrated two passage raceway 30 includes a rear or inner module 60 which is comprised of a rear wall 32, the top wall section 62 and the bottom wall section 64. Both the top and the bottom sections 62 and 64 have respective connection tabs 65 and 66 which are opposed to each other and together define a connection to a complementary support on the wall, not shown, to which the raceway is attached. The opposite forward side of the module 60 has a hook shape terminal piece at 72, 74 respectively at the top and bottom walls with a channel in it adapted to receive the rear tabs of the next, outer or front module 80, which is outward of the module 60 with respect to the wall to which the raceway is mounted. The outer or front module 80 has the same features as the inner module 60, which are not again described. The tabs at 65 and 66 on the outer module 80 are received in the channels of the hooks 72 and 74 of the rear module. The rear wall 32 and the divider 40 are respectively the rear sides or rear walls of the respective passages 46, 48 of their respective modules.

The front or outer passage 48 is provided with the L-shaped divider 56. To receive that divider, the forward facing side of both the wall 32 and the divider 40 has been provided with the channel defining unit 84 with a channel 86 therein. The bottom leg of the divider 56 is provided with a dovetail shape connecter piece 88 which can be slid into the channel 86 in those sections of the raceway where the additional L-shaped divider is needed.

The front wall or cover 34 of the raceway 30 closes the front passageway 48. That front wall or cover 34 may have an ornamental shape rather than a flat square or shape. The cover 34 may be a decorative cover that has an appearance of a chair, rail, or a molding at the junction between the ceiling and the wall, or a molding on the base of the wall, a shape that is a matter of choice to the designer. At its bottom end is a tab 92 received in the channel of the hook 94 on the bottom wall 44 of the front module 80. The shapes of the front tab 92 and of the hook 94 are selected to leave a notch 96, which permits the front wall or cover 34 to be initially mounted to the front wall 94 while swung outward. Then the front wall is swung in so that the inwardly facing tab 96 at the top wall end of the front wall 34 may be snapped into the hook 98 at the front of the top wall 42 at the front of the front module 80.

It is apparent that after the rear module is attached to its support, on a wall the front module may be attached to the rear module in the same manner as described just above, that is the bottom connection between the tab 66 and the hook 74 is made and then the front module is swung up so that the tab 68 at the rear side of the front module is snapped into the hook 72 of the rear module. The rear module and particularly its rear wall may be attached to a fixture, not shown, on the wall to which the raceway is mounted in the same manner. One benefit of this arrangement is that it is not necessary to slide the raceway into the supporting fixture, but rather the modules can be attached in sequence and swung up without sliding being necessary for the connection.

The connection between the tabs 76 and hooks 74 is like a ball and socket connection. Raceway elements are usually extruded. The ball and socket are extruded along one edge of their raceway components and the latch hooks are extruded on the other edge of their raceway components.

Each compartment is able to open. Since engineers and contractors want accessibility, this "hinged" system will allow the installer to open the cover without need for full cover removal. The system will be designed e.g., with a notch 96 to limit the tilt on the cover being opened, so that the raceway contents will not be freed to spill out. In theory, this system is infinitely expandable, since compartments could be built-up. Cf. U.S. Pat. No. 5,792,992.

In a raceway designed as disclosed herein, division between power and data cable portions is achieved with a vertical divider. The vertical divider enables the raceway to provide the necessary 1.2" bend radius for a 10 gig line without greater depth off the wall. In the inventor's estimation, a 3" high by 2" deep raceway of the inventor's new design would achieve what a current, standard-design raceway with dimensions of 4.75" high by 3.25" deep would.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A cable raceway including,
   top and bottom walls, a rear wall to be mounted on a surface, a front wall out from the surface, the walls defining a first cable passage and a second cable passage,
   a divider inside the raceway, defining and separating the first and second passages, the divider extending substantially along the entire lengths of the passageway, the divider being oriented to extend in a direction between the bottom and top walls of the raceway, a height and width of the raceway between the top and bottom walls being such that a bend radius in one cable can be accommodated in a vertical orientation of a passage between the top and bottom walls, but not in a horizontal orientation between the front wall and the rear wall of the raceway, wherein
   at least a portion of at least one of the top wall and bottom wall is configured for removal from the raceway to receive a device.

2. The raceway of claim 1, wherein the individual passages of the raceway are built up from a rear wall, a first profiled element defining the rear wall and defining the first passage attached to the rear wall;
   a second profiled element defining the front wall and the front passage which is away from the rear wall-and the second profiled element is attached to the first profiled element.

3. The raceway of claim 1, wherein the raceway is comprised of a plurality of modules, the modules include:
   a rear module including the rear wall of the raceway, a first section of the top wall and a first section of the bottom wall joined by the rear wall of the raceway, and a first fastening device at a front side of the rear module;
   a front module located forwarded of the rear module, the front module including a rear wall thereof which also defines the divider in the raceway, a second section of the top wall and a second section of the bottom wall which meet the first section of the top wall and the first section of the bottom wall, respectively, to define the top and bottom walls of the raceway,
   a second fastening device shaped and positioned to be fastened to the first fastening device of the rear module;
   a third fastening device at a front side of the front module; and
   a cover for covering over the front side of the front module, the cover including a third fastening device shaped and positioned and configured to be attached to the second fastening device for enclosing the front side of the raceway.

4. The raceway of claim 3, wherein the first fastening device and the second fastening device together comprise a first ball and socket arrangement at one of the top and bottom walls, with the ball at one of the modules and the socket for receiving the ball on the other module, the ball and socket being so shaped and configured that with the ball and socket of the first and second fastening devices engaged, the front module can be pivoted around the first ball and socket arrangement with respect to the rear module;
   and the second and third fastening devices also comprising a second one of the ball and socket arrangements with one of the top and bottom walls, the second ball and socket arrangement being shaped and configured to enable the cover to be pivoted around the second ball and socket arrangement with respect to the front module.

5. The raceway of claim 4, wherein, at the other of the top and bottom walls, one of the rear and front modules having a hook and the other module having a tab thereon, such that when the rear and front modules are rotated together, the tabs snap into the hook, locking the first and second modules;

one of the second and third fastening arrangements at the other of the top and bottom walls comprises a hook and the other fastening arrangement comprises a tab, and the tab snaps into the hook when the cover is closed over the front side of the front module.

6. The raceway of claim 5, wherein the raceway is comprised of extruded elements.

7. The raceway of claim 1, further comprising a horizontal divider disposed in one of the passages, and the horizontal divider being supported on at least one of the rear or front walls of the respective passage.

8. The raceway of claim 1, wherein the rear wall, front wall, bottom wall and the divider are formed as a single extruded element.

9. The raceway of claim 7, wherein the top wall is formed as a separate extruded element and is removably connected to the raceway.

* * * * *